United States Patent [19]

Lestraden

[11] Patent Number: 4,513,531
[45] Date of Patent: Apr. 30, 1985

[54] METHOD AND DEVICE FOR GROWING PRODUCTS

[75] Inventor: Jacobus W. Lestraden, Sassenheim, Netherlands

[73] Assignee: Schulte & Lestraden B.V., Sassenheim, Netherlands

[21] Appl. No.: 398,438

[22] Filed: Jul. 14, 1982

[30] Foreign Application Priority Data

Jul. 14, 1981 [NL] Netherlands ............. 8103335

[51] Int. Cl.³ .................................. A47G 7/00
[52] U.S. Cl. ................................... 47/39; 47/17
[58] Field of Search ............... 47/17, 18, 39, 65, 83, 47/84, DIG. 6; 211/151, 49 D; 193/361; 193/35 A, 35 R; 362/122, 128, 373, 294, 431

[56] References Cited

U.S. PATENT DOCUMENTS

| 3,314,192 | 4/1967 | Park ........................ 47/39 |
| 3,624,380 | 11/1971 | Davis ...................... 47/17 |
| 3,772,827 | 11/1973 | Ware ....................... 47/39 |
| 4,250,666 | 2/1981 | Rakestraw ............. 47/39 |

FOREIGN PATENT DOCUMENTS

| 0024346 | 3/1981 | European Pat. Off. . | |
| 2602457 | 8/1977 | Fed. Rep. of Germany . | |
| 2639088 | 2/1978 | Fed. Rep. of Germany . | |
| 961315 | 3/1957 | Netherlands ............. | 47/DIG. 6 |
| 6705946 | 10/1969 | Netherlands . | |
| 737315 | 12/1977 | U.S.S.R. ................. | 211/151 |

Primary Examiner—Robert A. Hafer
Assistant Examiner—Bradley M. Lewis
Attorney, Agent, or Firm—Oblon, Fisher, Spivak, McClelland & Maier

[57] ABSTRACT

Cases for propagating plants are positionable on supports adjacent a rotating vertical column. Light sources on the vertical column rotate over the plants in the propagating cases so as to provide even illumination. The vertical column is hollow and includes a blower for withdrawing heated air from adjacent the propagating cases. The support structures on which the propagating cases are positioned have rows of holes through which rollers can extend. The rollers are mounted on tracks which can be tilted so that the cases will roll by gravity either toward or away from the column for installing or removing the propagating cases. The light sources are removable from the column and can be selectively removed for varying the distance between the propagating cases and the plants as the plants grow.

12 Claims, 5 Drawing Figures

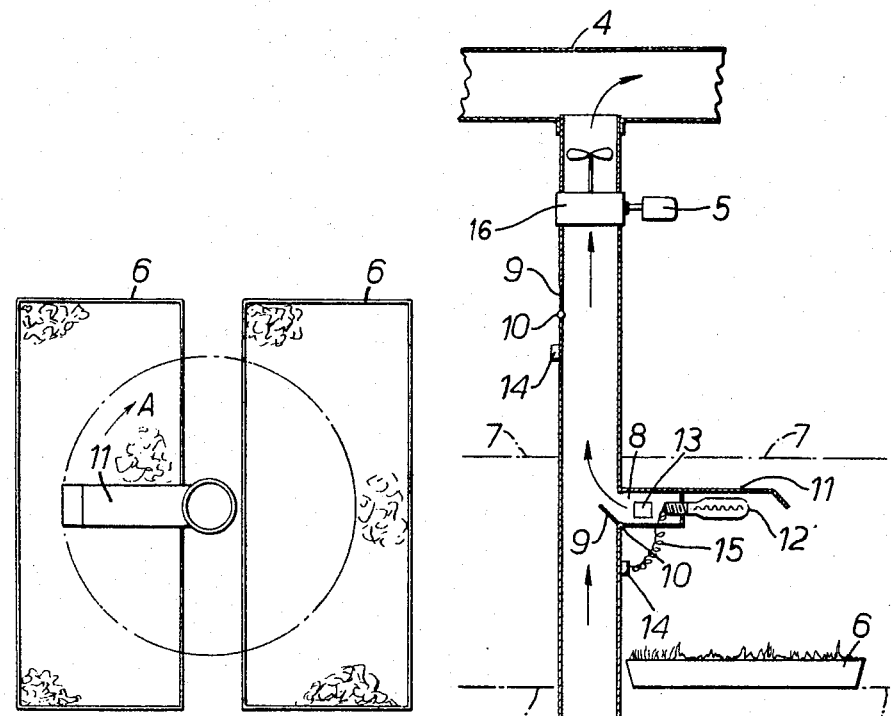
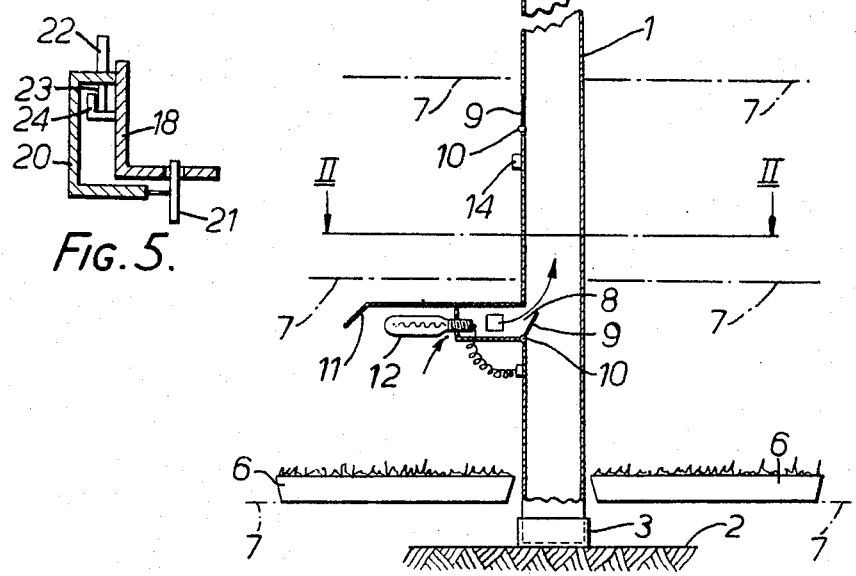

METHOD AND DEVICE FOR GROWING PRODUCTS

BACKGROUND OF THE INVENTION

The invention relates to a method of moving propagating cases into and out of a stander rack in which a plurality of propagating cases are supported one above the other by supporting members forming part of the stander.

Many products are grown in cases disposed one above the other in standers. During the growth of the products regular insertion and removal of the propagating cases into and out of the standers are necessary, for example, for nursing activities and/or for harvesting such products. It is desirable for this insertion and removal of the propagating cases to be performable with a minimum of energy, whilst on the other hand unnecessary displacements of the propagating cases, when disposed in the standers, have to be avoided.

SUMMARY OF THE INVENTION

According to the invention the propagating cases are displaced with respect to the supporting members with the aid of rollers vertically displaceable relative to the supporting members.

By using such vertically adjustable rollers the propagating cases can be lifted in a simple manner with the aid of the rollers from the supporting members and be subsequently displaced with the aid of the rollers. When on the other hand the propagating cases are disposed in the desired position relative to the supporting members and the rollers are moved downwards, undesirable displacements of the propagating cases are avoided.

When the design is such that at least some rollers can be driven, the displacement of the propagating cases can be performed in a simple manner without requiring great personal efforts.

A further aspect of the invention relates to a method of growing products in superimposed cases, in which a case is illuminated from above with the aid of a light source.

This method of growing products in closed spaces, in which climatic conditions can be satisfactorily controlled, becomes more and more common practice. Herein the products to be grown are illuminated by artificial light in order to enhance the growth of the products. Such light sources, however, also dispense a given amount of heat and in the vicinity of the light source the temperature may locally rise to an undesirable high value.

According to the invention air is withdrawn from the space around the cases, along that light source or the parts feeding the light source. In this way the parts locally producing heat are effectively cooled by the draft of air so that undesirable local heating of products is avoided.

BRIEF DESCRIPTION OF THE DRAWINGS

The invention will be described more fully hereinafter with reference to the accompanying Figures which schematically show parts of the device embodying the invention.

FIG. 1 schematically shows a vertical supporting column for supporting light sources with propagating cases also shown schematically and arranged on two sides thereof.

FIG. 2 is a schematic sectional view of the arrangement of FIG. 1 taken on the line II—II in FIG. 1.

FIG. 5 is a schematic, enlarged sectional view of a carrier supporting a propagating case and a roller track coupled therewith.

DETAILED DESCRIPTION OF THE PREFERRED EMBODIMENT

Figure 3:
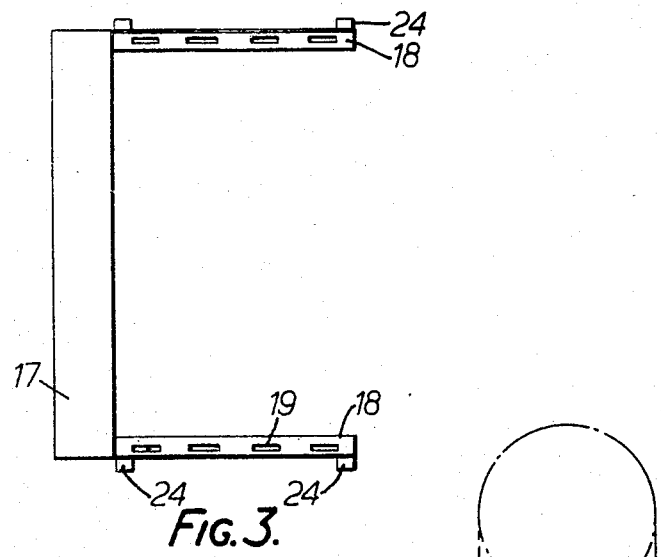
FIG. 3 is a schematic plan view of an embodiment of a rack for supporting propagating cases.

FIG. 1 shows a vertically disposed column 1, which is rotatably supported on the bottom side in a supporting foot 3 on the ground and is rotatably supported at the top in a connection with an outlet conduit 4. The column 1 formed by a hollow pipe can be turned during operation with the aid of a driving motor 5 shown schematically.

One or more of such columns may be disposed in a so-called growing room, that is to say, a closed space in which a large number of propagating cases can be disposed side by side and one above the other. FIG. 1 schematically shows that for this purpose supporting members 7 indicated by dot-and-dash lines are arranged on both sides of the column, which supporting members may be united to form, for example, a rack.

Viewed in the direction of length of the column 1 holes 8 are provided at given, equal intervals in the wall of the tubular column, which holes can be closed with the aid of flaps 9, which are pivotable about horizontal pivotal shafts 10 located near the underside of said flaps. With the aid of coupling members (not shown in detail) housings 11 may be coupled and decoupled in the area of said flaps. These housings 11 serve to support light sources 12, which may be fed, for example, with the aid of converters 13 or the like accommodated in the housings. For supplying energy to the light sources 12 a contact box 14 is fastened to the column 1 near each hole 8, to which contact box the lamp 12 can be connected with the aid of a lead 15.

FIG. 1 furthermore shows schematically that a blower 16 is arranged near the top end of the column 1.

The relevant parts of the housing 11 are arranged so as to be reflective in a manner such that a desired diffusion of the light emanating from the source 12 is obtained.

It will be obvious that during a turn of the column 1 the various light sources 12 will turn in the direction of the arrow A in FIG. 2 so that a light source 12 will constantly change in position above a further part of the propagating case 6 on one side of the column 1 or the other and hence by means of a single light source 12 sufficient light can be supplied to a comparatively large surface for growing the products concerned. Due to the rectangular shape of the cases it may occur that the outermost corners of the cases receive less light than the further parts of the cases despite an optimum distribution of light by an appropriate design of the housing 11. However, in practice it has been found that slight variations in the illumination of given parts of the cases will not give rise to annoying deviations of the growth of the products in the cases.

The device described in the foregoing is furthermore eminently suitable for matching the height of the plants growing in the cases. At the beginning of the growth a light source 9 may be arranged, for example, in each hole 9 and a propagating case may be disposed closely below said light source. When the plants have grown to a given height, a case located directly below a light source can be removed together with the light source located below said case so that the remaining light source will illuminate the case initially illuminated by the removed light source. At a further growth of the plants this manipulation may, as the case may be, be repeated.

The climate in the growing room provided with the above-described structure can be influenced by withdrawing air from the growing room with the aid of the blower 16. The air is sucked through the orifices 8, said air passing by the lamp 12 and the parts 13 feeding the lamp so that these parts are simultaneously cooled. It will be obvious that instead of arranging a blower 16 in each column, a blower may be connected with the outlet conduit 4 to serve a plurality of columns 1 connected with the outlet conduit 4.

As indicated stated above it is a regular necessity to move the propagating cases into and out of the racks supporting the cases. This can be effectively and simply carried out by using the constructions illustrated in FIGS. 3 to 5.

Figure 4:
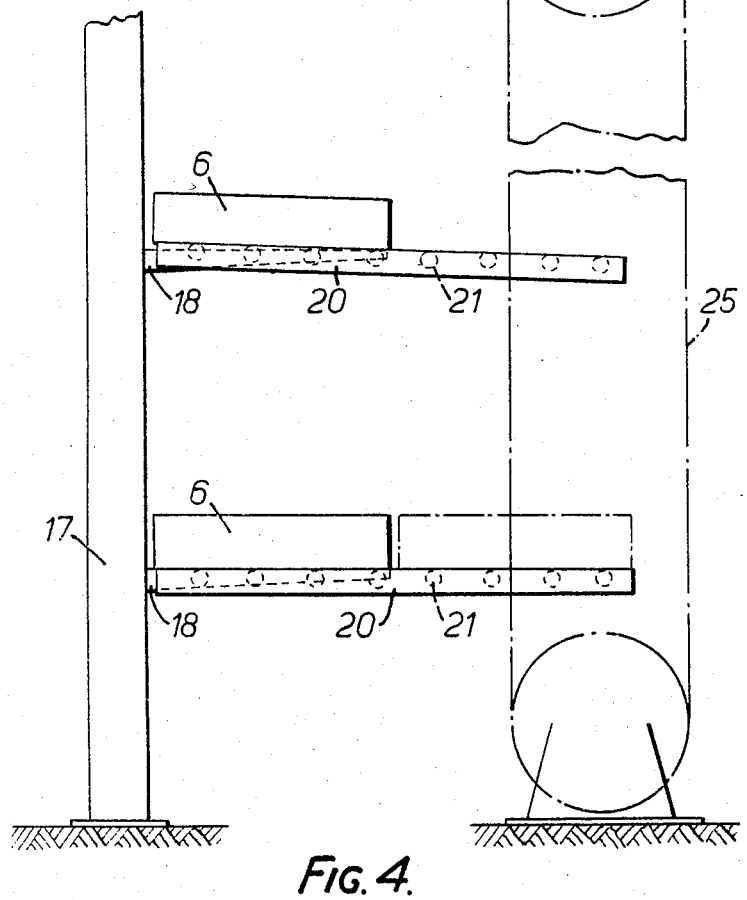
FIG. 4 is a schematic side elevation of the device of FIG. 3.

FIGS. 3 and 4 schematically show that a propagating case 6 is supported at its ends adjacent the column 1 by supporting members 7 in the form of angle-section irons 18 fastened to a supporting structure 17 (shown only schematically). The horizontal limbs of the angle-section irons 18, on which the rims of the propagating cases bear, have elongate holes 19 extending at equal intervals in the direction of length of the limb.

For moving the propagating cases in and out roller tracks may be employed, each of which is formed by an elongate beam 20 pivoted to the irons 18 about a horizontal axis and a plurality of equally spaced rollers 21 supported by the beam 20. From FIG. 4 it will be apparent that the distance between these rollers 21 is such that a plurality of these rollers can be slipped from below into the elongate holes 19.

To the beam 20 are fastened setting means, for example, two relatively spaced hydraulic rams 22, the piston rods 23 of which co-operate with stops 24 provided near the ends of the supports 18 (FIG. 5). When a roller track formed by a beam 20 and a plurality of rollers 21 is hooked to the stops 24 with the aid of the piston rods 23 of the rams 22, the rollers 21 can be pushed upwards from below through the elongate holes 19 by actuating the rams 22 so that the rollers lift the case 6 from the support 18 concerned. Subsequently, by suitably adjusting the rams 22 the roller track can be put into an inclined position as is shown, by way of example, for the upper roller track of FIG. 4 so that the case 6 tends to move to the right, as viewed in FIG. 4 under the action of gravity towards a discharging mechanism 25 (shown only schematically) provided with supporting members (not shown) for receiving the case concerned. With the aid of said discharging mechanism the removed case may be displaced in a direction of height and/or be conducted away to a delivery belt or the like or it may be set on a different level.

It will be obvious that for inserting a case a similar manipulation can be carried out, at which time the case concerned will be put with the aid of the discharging mechanism 25 on the ends of the roller tracks projecting beyond the supports 18, the roller tracks being subsequently set so that they are downwardly inclined towards the supporting members 18.

If desired, the roller tracks may be equipped with a few rollers to be driven so that a positive displacing force can be exerted on the propagating cases. When drivable rollers are employed, it will frequently not be necessary to equip the roller track with means enabling an inclined disposition of the roller track.

What is claimed as new and desired to be secured by Letters Patent of the United States is:

1. A method of moving propagating cases into and out of a stander in which a plurality of propagating cases are supported one above the other by supporting members forming part of the stander, said supporting members being formed by vertically spaced beams having recesses, comprising the steps of:

inserting rollers through said recesses from below to raise said cases with respect to said beams; and
   displacing said raised propagating cases with respect to the supporting members.

2. A method as claimed in claim 1 wherein at least some of the rollers can be driven.

3. A method as claimed in claim 1 or 2 wherein said propagating cases are lifted by roller tracks supporting said rollers, the position of said tracks being adjustable about a horizontal axis of rotation.

4. A stander in which a plurality of cases are supported one above the other by supporting beams forming part of the stander, each of said beams having recesses arranged along the length of said beam, rollers for moving said propagating cases with respect to said beams, wherein said rollers are arranged in a row on a roller track provided with coupling means, said coupling means coupling said roller track to said supporting beams in a manner such that said track is adjustable in a direction of height so that said rollers can be inserted through said recesses from below to raise said propagating cases.

5. A device as claimed in claim 4 wherein coupling means couples said roller track to said supporting beams for pivoting said roller track about a horizontal pivotal axis extending parallel to the roller track.

6. A device as claimed in claim 4 or 5 wherein said roller track is longer than said supporting members so that, when the roller track is coupled with said supporting beams the roller track projects beyond the supporting members.

7. A method of growing products in superimposed cases in which a case is illuminated from above with the aid of a light sources, including a vertical supporting column for supporting said light sources arranged one above the other, said supporting column being provided with openings at positions of contact with said light sources, said supporting column including means for drawing off air and located within the interior of the supporting column, comprising the steps of utilizing said means for drawing off air to withdraw air from the room in which the cases are located during operation, and directing said air to said light sources and through the interior of said column to parts feeding the light sources.

8. A method as claimed in claim 7 wherein during growing the distance between the light source and the case illuminated by the light source is varied in dependence on the growth of the plants.

9. A method as claimed in claim 8 wherein said variation in distance is performed by removing a first case illuminated by a first said light source wherein a second case disposed on a lower level than the removed first case is illuminated by the first light source, and removing a second light source positioned between said first light source and said second case.

10. A method as claimed in anyone of the preceding claims 7 to 9 wherein said light source is turned during operation about an upwardly extending axis of rotation so that the position of the light source varies in relation to the case.

11. A device as claimed in claim 7 wherein said light sources are detachably fastened to the column at openings of said column, said column including closing means for closing the openings arranged at the locations of the openings in the column.

12. A device as claimed in claim 7 or 11 wherein said column is rotatable about a longitudinal axis thereof, said cases being disposed on two sides of the column.

* * * * *